March 17, 1970          W. BELL          3,500,713

DRILL SCREW AND REAMING COLLAR THEREFOR

Filed March 14, 1968

INVENTOR.
WALTER BELL
BY
*Friedman & Goodman*
ATTORNEYS

United States Patent Office 3,500,713
Patented Mar. 17, 1970

3,500,713
DRILL SCREW AND REAMING COLLAR THEREFOR
Walter Bell, Monroe, N.Y., assignor to Star Expansion Industries Corporation, Mountainville, N.Y., a corporation of Delaware
Filed Mar. 14, 1968, Ser. No. 713,245
Int. Cl. F16b 25/00, 35/00
U.S. Cl. 85—41           7 Claims

ABSTRACT OF THE DISCLOSURE

The invention is directed to a self-drilling and self-tapping screw for drilling and fastening a first work member to a harder second work member. Material removing means provided on the screw extend radially outwardly to form a clearance hole for the threads in the first work member, and when said material removing means contact the harder second work member the threaded portion of the screw threadingly, lockingly, engages the said harder work member.

BACKGROUND OF THE INVENTION

Field of the invention

This invention relates to a drill screw and more particularly relates to a screw adapted to be used in fastening two or more panels in superposed relationship.

Description of the prior art

It is quite common in fastening two panels together to provide a pilot hole in the first panel with the pilot hole being greater than the major diameter of the screw threads.

If such a pilot hole is not provided the threads of the screw will engage said first panel and quite often will not permit the panels to be maintained in juxtaposed relationship since the rate of penetration of the screw into the second panel is different than the rate of movement between the threads of the screw and the first panel. This results in a raising of the first panel away from the second panel and unless they are securely clamped together results in an undesirable or unwanted spacing between adjacent panels.

A conventional prior art drill screw, described in U.S. Patent 3,358,548, provides frangible means intermediate the drill tip and the threaded portion of the screw which frangible means consist of a pair of ears. These ears act as material removing members in the first work member and when the drill screw tip has penetrated the first work member, the ears, because of their weak structure, when they come in contact with the upper surface of the harder second work member, will be either completely fractured and separated at their integral juncture with the shank portion of the screw or, alternatively, will be wiped back into slots provided at the aforesaid juncture. Thus, the frangible means (ears) will have its effective radial extent reduced so that the threaded portion of the screw will then be axially movable in the harder work member, and thereby engage it.

It is a problem with this prior art drill screw that once the drill tip has penetrated the first work member, it is difficult to maintain the screw shank in a centered position, in the hole resultingly formed by the material removing member, until the tip comes in contact with the second harder work member. The result is that the screw can then enter the second work member in off-centered fashion thereby preventing proper super-position of the two members, as well as causing the screw head not to be in smooth abutting relation with the first work member.

SUMMARY OF THE INVENTION

It is therefore among one of the principal objectives of the invention to provide a self-drilling and tapping screw which will be adapted to maintain the shank in a centered position at all times and to threadingly, lockingly engage two work members together.

In accordance with the present invention there has now been provided a screw adapted to fasten two or more superposed work members including a drilling tip, a threaded shank and a head, said shank being threaded for a substantial portion of its length, material removing means provided on and extending radially outwardly from said shank between the leading threaded portions of said threaded shank, and adapted to provide a clearance hole in at least the first one of said work members contacted by said screw but not in another of said work members which is of harder material than said first work member, whereby when said material removing means contacts said harder material, said threaded shank will effectively engage only said other work member of harder material.

BRIEF DESCRIPTION OF THE DRAWING

The invention will be hereinafter more fully described with reference to the accompanying drawing, in which.

DESCRIPTION OF THE PREFERRED EMBODIMENTS

Figure 1:
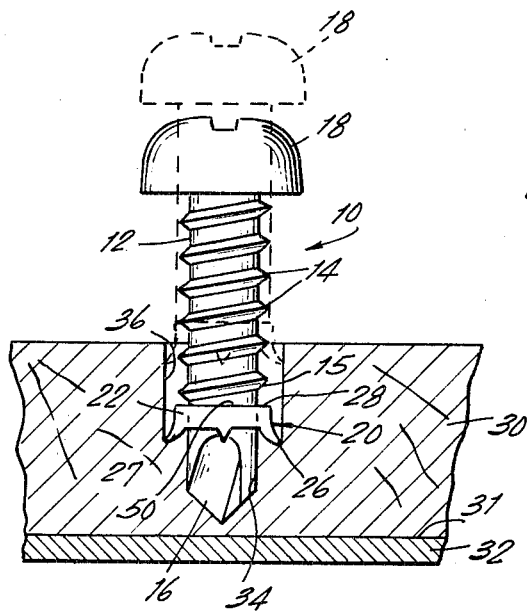
FIGURE 1 is an elevational view, in partial section, showing the application of the screw, embodying the principles of the present invention, to a pair of superposed panels.

Referring now to the drawings wherein similar parts bear similar numerals, a screw 10 embodying the principles of the present invention would include a shank 12 having threads 14 along a substantial portion of its extent, a tip 16 at its entering end and a head 18 provided with suitable driving means (not shown) at the opposite end. The tip 16 in the embodiment disclosed is provided with drilling flutes of the type disclosed in U.S. Patent 3,125,-923, but for purposes of the present invention drill points of other configurations can be used with equal facility. The threads 14 are of a thread-forming configuration or spaced in nature, as is well known in the art.

Figure 2:
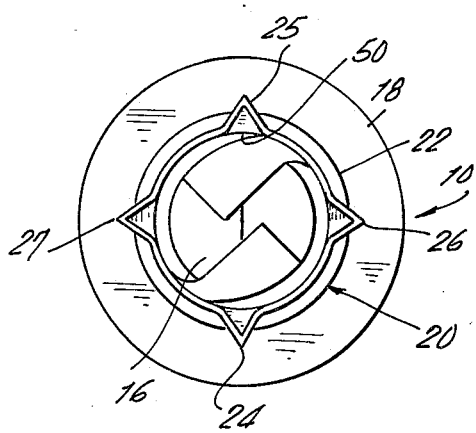
FIGURE 2 is a bottom plan view of the invention screw.

Intermediate the first two leading threads 13 and 15, respectively, of the threaded portion 14 of the shank 12 there is provided a reaming collar 20, thread 13 not being visible in FIG. 1 since it is substantially overlain by said collar 20 in the reaming portion thereof. Reaming collar 20 comprises a generally annular member 22, having at least one, but preferably four (or more) tines 24, 25, 26, 27; said tines further curving downwardly, outwardly from the top portion 28 of annular member 22 and being integrally joined to annular member 22. Reaming collar 20 can be a solid body or hollow, preferably the latter since then the chips or waste material which is a by-product of the drilling operation can be caught up under reaming collar 20 and gathered inside the hollow. Tines 24, 25, 26 and 27, are preferably diametrically opposed, as can be readily observed in FIG. 2. Thus, it can be seen that the said tines form a serrated or saw-tooth effect, particularly effective for the reaming operation to be described subsequently. The reaming collar 20 is forced fit partly over first thread 13 which is generally of smaller diameter than the succeeding threads, but is below second thread 15 of the screw 10, by means of centrally registered bore 50 in collar 20. The forced fit of the collar 20 is of such a tenacious nature as to prevent its riding up the threaded portion 14 of the shank 12 when the screw is turned during the reaming operation to be described.

Figure 3:
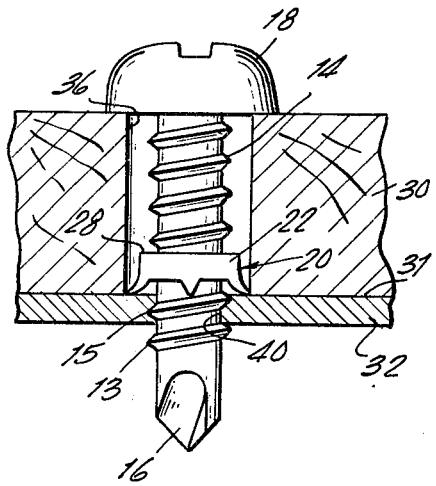
FIGURE 3 is an elevational view, in partial section, showing the invention screw in final mounted, locked condition.

The specific application of the screw embodying the principles of this invention is best seen in FIGS. 1 and 3 wherein the screw is used to fasten two superposed panels 30 and 32 of dissimilar materials. The first panel or work member 30 is preferably softer than the second work member or panel 32. In the present embodiment, the panel 30 is of wood and panel 32 is of metal. As the screw is applied by axial pressure from the head and rotated, as shown by the direction of the arrow in FIG. 1 and the dotted lines, the drill point or tip 16 will create its own bore 34 through panel 30 with the tines 24, 25, 26, 27 acting as reamers or counter-bores to enlarge the diameter of the bore to form a pilot hole 36. Thus, the threaded portion 14 is permitted free passageway through the pilot hole 36 and will not interfere with the drilling operation in panel hole 32 since it is not contacting for engaging panel 30. By virtue of the force fit of reaming collar 20, as the screw rotates the collar rotates, thereby creating the reaming effect above-described.

When the tip 16 has penetrated panel 32 the tines 24, 25, 26, 27 projecting downwardly, and radially, from annular member 22 of collar 20 are brought into contact with the upper surface 31 of panel 32. The tines (or prongs) "bite" into the harder panel 32 (metal) and the-rotation of the reaming collar 20 stops. As the screw axially progresses within the aperture 40 in panel 32 the threads 14 self-tap mating threads in panel 32 whereby engagement of the head 18 with the opposite surface of panel 30 results in the drawing up of panel 32 into tight, superposed relation to the other panel 30. The collar 20 by its tines "biting" into panel 32 has, as mentioned, stopped rotating and screw 10 can be axially turned therethrough by means of bore 50 in collar 20. Since the reaming collar 20 is eventually forced onto the upper threads 14 (FIG. 3) by its contact with the metal panel 32, said collar, when the screw 10 is fully set home, becomes tightly imprisoned, as it were, against said metal panel, and the tines of the collar act as a locking device, preventing loosening of the screw by vibration, or the like. Thus, not only does reaming collar 20 assist in maintaining the shank 12 in a centered position at all times, with respect to bore 36, but it also acts ultimately as a locking device for the screw.

Having thus described the fundamental novel features of the invention as applied to a specific embodiment, it is to be understood that various changes may be made by those skilled in the art without departing from the spirit and scope thereof.

What is claimed is:

1. A screw adapted to fasten two or more superposed work members including a drilling tip, a threaded shank and a head, said shank being threaded for a substantial portion of its length, material removing means provided on and extending radially outwardly from said shank between the leading threaded portions of said threaded shank and adapted to provide a clearance hole in at least the first one of said work members contacted by said screw but not in another of said work members which is of harder material than said first work member whereby when said material removing means contacts said harder material said threaded shank will effectively engage only said other work member of harder material, wherein said material removing means comprise a reaming collar which further comprises a generally annular member having at least one tine curving downwardly, and outwardly from the upper portion of said annular member, towards said drilling tip, and being integrally joined to said annular member, means non-rotatably securing said collar to said threaded shank for material removing purposes and which permit said threaded shank to advance through said collar at the conclusion of the material removing function.

2. A screw according to claim 1, wherein said tines further comprise a plurality of tines.

3. A screw according to claim 2, in combination with a pair or dissimilar work members wherein the first work member is softer than said tines and the second work member is harder than the first work member, said tines adapted to cut a clearance hole in said first work member and to be held relative to said shank upon contacting said second work member whereby the threads on said shank will actively engage only said second work member and thereby permit said threads in cooperation with said head to draw both said work members into tight superposition.

4. A screw according to claim 1, wherein said tines further comprise a plurality of tines greater than two.

5. A screw according to claim 1, wherein said tines at their laterally outwardly extremities generate a circle upon rotation of the screw equal to or larger than the crest diameter of the threaded portion of said shank.

6. In combination a self-drilling and a tapping screw and material removing means therefor comprising a reaming collar, said reaming collar further comprising a generally annular member having at least one tine extending radially outwardly therefrom, and curving downwardly and outwardly from the upper portion of said annular member, towards the tip of said screw, and being integrally joined to said annular member, and a bore being centrally provided in said annular member for the passage of the screw therethrough and including means non-rotatably securing said collar to said screw for material removing purposes and which permit said screw to advance through said collar at the conclusion of the material removing function, said reaming collar thus also acting as a locking device for said screw.

7. A screw adapted to fasten two or more superposed work members including a drilling tip, a threaded shank and a head, said shank being threaded for a substantial portion of its length, material removing means provided on and extending radially outwardly from said shank between the leading threaded portions of said threaded shank and adapted to provide a clearance hole in at least the first one of said work members contacted by said screw but not in another of said work members which is of harder material wherein said material removing means comprise a reaming collar which further comprises a generally annular member having at least one tine curving downwardly and outwardly from the upper portion of said annular member, towards said drilling tip, and being integrally joined to said annular member and wherein said reaming collar is forced fit over the leading thread of said threaded shank and is situated intermediate said leading thread and the next thread, a bore being centrally provided in said reaming collar for that purpose.

References Cited

UNITED STATES PATENTS

| | | | |
|---|---|---|---|
| 1,664,796 | 4/1928 | Spangle | 85—47 |
| 2,372,719 | 4/1945 | Freese | 77—66 |
| 2,667,795 | 2/1954 | Bowen | 77—65 |
| 3,044,325 | 7/1962 | Halpern | 77—66 |
| 3,358,548 | 12/1967 | Dyslin | 85—47 |
| 1,419,652 | 6/1922 | Turner | 85—41 |

EDWARD C. ALLEN, Primary Examiner